(12) United States Patent
Muraki

(10) Patent No.: US 8,320,452 B2
(45) Date of Patent: Nov. 27, 2012

(54) IMAGING APPARATUS WITH MOTION VECTOR DETECTING FUNCTION

(75) Inventor: Jun Muraki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1463 days.

(21) Appl. No.: 11/585,018

(22) Filed: Oct. 23, 2006

(65) Prior Publication Data
US 2007/0092009 A1  Apr. 26, 2007

(30) Foreign Application Priority Data
Oct. 26, 2005  (JP) ................................. 2005-311757

(51) Int. Cl.
*G06K 9/34* (2006.01)
(52) U.S. Cl. ................ 375/240.16; 382/173; 348/208.99
(58) Field of Classification Search ............... 375/240.16
See application file for complete search history.

(56) References Cited

U.S. PATENT DOCUMENTS

| | | | |
|---|---|---|---|
| 5,835,138 A | 11/1998 | Kondo | |
| 6,751,350 B2 | 6/2004 | Crinon et al. | |
| 7,450,155 B2 * | 11/2008 | Nakanishi et al. | 348/208.5 |
| 2002/0191846 A1 * | 12/2002 | Crinon et al. | 382/173 |
| 2004/0001147 A1 | 1/2004 | Vella et al. | |

FOREIGN PATENT DOCUMENTS

| | | |
|---|---|---|
| EP | 0762774 A2 | 3/1997 |
| EP | 0789487 A2 | 8/1997 |
| EP | 1301044 A1 * | 4/2003 |
| EP | 1377040 A1 | 1/2004 |
| JP | 06-046316 A | 2/1994 |
| JP | 8-251474 A | 9/1996 |
| JP | 2000-023024 A | 1/2000 |
| JP | 2003-079620 A | 3/2003 |
| JP | 2005-117343 A | 4/2005 |

OTHER PUBLICATIONS

Notification Concerning Transmittal of International Search Report and Written Opinion of the International Searching Authority for PCT/JP2006/319817, dated Jan. 10, 2007, 11 sheets.
Chinese "Notification for the Opinion of Examination" dated Nov. 12, 2009 and English translation thereof, issued in counterpart Chinese Application No. 095139314.
Japanese Office Action dated Feb. 13, 2012 (and English translation thereof) in counterpart Japanese Application No. 2005-311757.
Japanese Office Action dated Nov. 29, 2011 (and English translation thereof) in counterpart Japanese Application No. JP 2005-311757.

* cited by examiner

*Primary Examiner* — Sath V Perungavoor
*Assistant Examiner* — Mohammed Jebari
(74) *Attorney, Agent, or Firm* — Holtz, Holtz, Goodman & Chick, PC

(57) ABSTRACT

When frame data is acquired to a digital camera, a block split section splits the frame data into a plurality of correlation detection blocks, an average value calculation section calculates an average pixel value of each of the correlation detection blocks, and an activity calculation section calculates a block activity value of each of the correlation detection blocks from the calculated average pixel value of each of the correlation detection blocks. Next, a group allocation section allocates the individual correlation detection blocks to two groups on the basis of the calculated block activity value, and a motion vector for each group is calculated using the representative point matching method. Next, the motion vector calculation section calculates the entire motion vector from the motion vectors for each group in accordance with the ratio between the numbers of calculation detection blocks in each group.

21 Claims, 8 Drawing Sheets

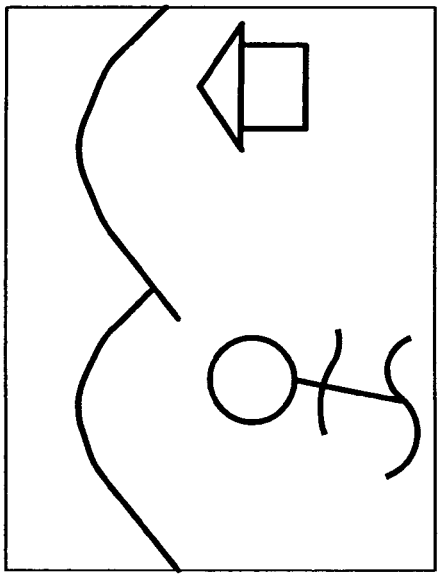
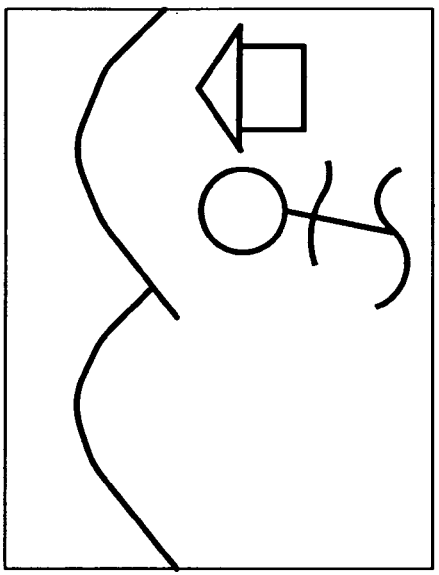
FIG. 4A
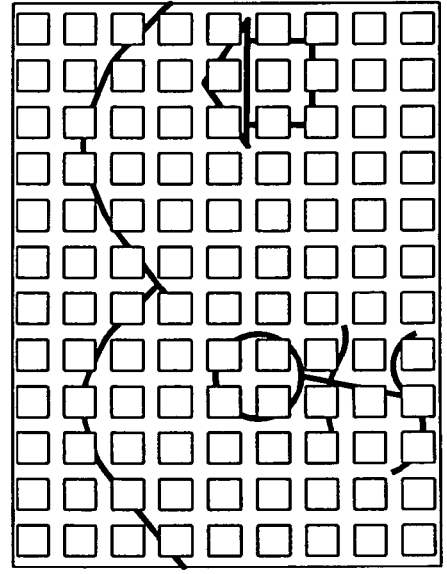
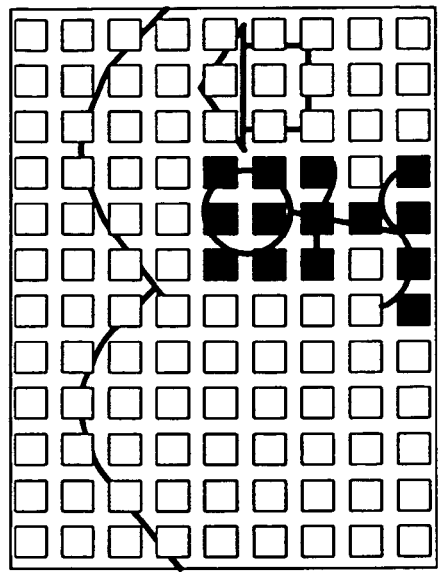
FIG. 4B

US 8,320,452 B2

IMAGING APPARATUS WITH MOTION VECTOR DETECTING FUNCTION

CROSS-REFERENCE TO RELATED APPLICATION

This application is based upon and claims the benefit of priority from the prior Japanese Patent Application No. 2005-311757, filed Oct. 26, 2005, the entire contents of which is incorporated herein by reference.

BACKGROUND OF THE INVENTION

1. Field of the Invention

The present invention relates to an image apparatus that can be used for a digital camera, a motion detection apparatus and a method of detecting a motion vector.

2. Description of the Related Art

Recently, an imaging apparatus, for example, a digital camera equipped with a hand shake correction function to prevent the shake of an object image caused by hand shake has appeared on the market. As an art to detect the hand shake amount required for correcting the hand shake, an art to detect a motion vector of the hand shake using the representative point matching method has been introduced.

In the art, for example, a plurality of motion vector detection regions are provided in the image, and the motion vector of each region is detected with the representative point matching method. Next, the detected motion vector in each region is evaluated according to the temporal change of the motion vector and other elements so as to acquire the reliability. Next, the vectors are selected and synthesized in accordance with the reliability, thereby to acquire a motion vector representing the entire image (refer to Japanese Laid-Open (Kokai) Patent Application No. H06-046316 (1994).

SUMMARY OF THE INVENTION

In accordance with one aspect of the present invention, there is provided a motion vector detection apparatus is configured to include: an acquisition section for acquiring frame data; an activity calculation section for calculating a block activity value on the basis of the frame data acquired by the acquisition section for each correlation detection block; an allocation section for allocating a plurality of correlation detection blocks to a plurality of groups on the basis of the block activity value of each of the correlation detection blocks calculated by the activity calculation section; a motion vector calculation section for calculating a motion vector for each group to which allocation has been performed by the allocation section; and a detection section for detecting the motion vector of the frame data by calculating a single motion vector on the basis of the motion vectors for each group calculated by the motion vector calculation section in accordance with the ratio between the correlation detection blocks which are allocated to a plurality of respective groups by the allocation section.

In accordance with another aspect of the present invention, there is provided an imaging apparatus comprising: an image pick-up section for picking up an image of an object and outputting image data; an activity calculation section for calculating a block activity value on the basis of the image data outputted from the image pick-up section; an allocation section for allocating a plurality of correlation detection blocks to a plurality of groups on the basis of the block activity value of each of the correlation detection blocks calculated by the activity calculation section; a motion vector calculation section for calculating a motion vector for each group to which allocation has been performed by the allocation section; a detection section for detecting a motion vector of the image data by calculating a single motion vector from the motion vectors for each group calculated by the motion vector calculation section in accordance with the ratio between the correlation detection blocks which are allocated to a plurality of respective groups by the allocation section; and a camera shake compensation section for executing camera shake compensation processing to the image data on the basis of the motion vector of the image data detected by the detection section.

In accordance with another aspect of the present invention, there is provided a method of detecting a motion vector comprising the steps of: an acquisition step for acquiring frame data; an activity calculation step for calculating a block activity value for each correlation detection block from the frame data acquired by the acquisition step: an allocation step for allocating a plurality of correlation detection blocks to a plurality of groups on the basis of the block activity value of each of the correlation detection blocks calculated by the activity calculation step; a motion vector calculation step for calculating a motion vector for each group allocation has been performed by the allocation step; and a detection step for detecting the motion vector of the frame data by calculating a single motion vector from the motion vectors for each group calculated by the motion vector calculation step in accordance with the ratio between the correlation detection blocks which are allocated by the allocation step to a plurality of groups.

In accordance with another aspect of the present invention, there is provided a computer program product for an executing motion vector detection program in an imaging apparatus stored on a computer-readable medium and executed by a computer, comprising: an acquisition processing step of acquiring frame data; an activity calculation processing step of calculating a block activity value for each correlation detection block on the basis of the frame data acquired by the acquisition processing step; an allocation processing step of allocating a plurality of correlation detection blocks to a plurality of groups on the basis of the block activity value of each of the correlation detection blocks calculated by the activity calculation processing step; a motion vector calculation processing step of calculating a motion vector for each group to which allocation has been performed by the allocation processing step; and a detection processing step of detecting the motion vector of the frame data by calculating a single motion vector on the basis of the motion vectors for each group calculated by the motion vector calculation processing step in accordance with the ratio between the correlation detection blocks which are allocated by the allocation processing step to a plurality of groups.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4A and FIG. 4B are diagrams for illustrating the outline of the invention;

DETAILED DESCRIPTION OF THE PREFERRED EMBODIMENTS

Hereinafter, the preferred embodiments of the present invention will be described with reference to the drawings as an example of application of a motion vector detection apparatus of the present invention to a digital camera.

A. Configuration of the Digital Camera

Figure 1:
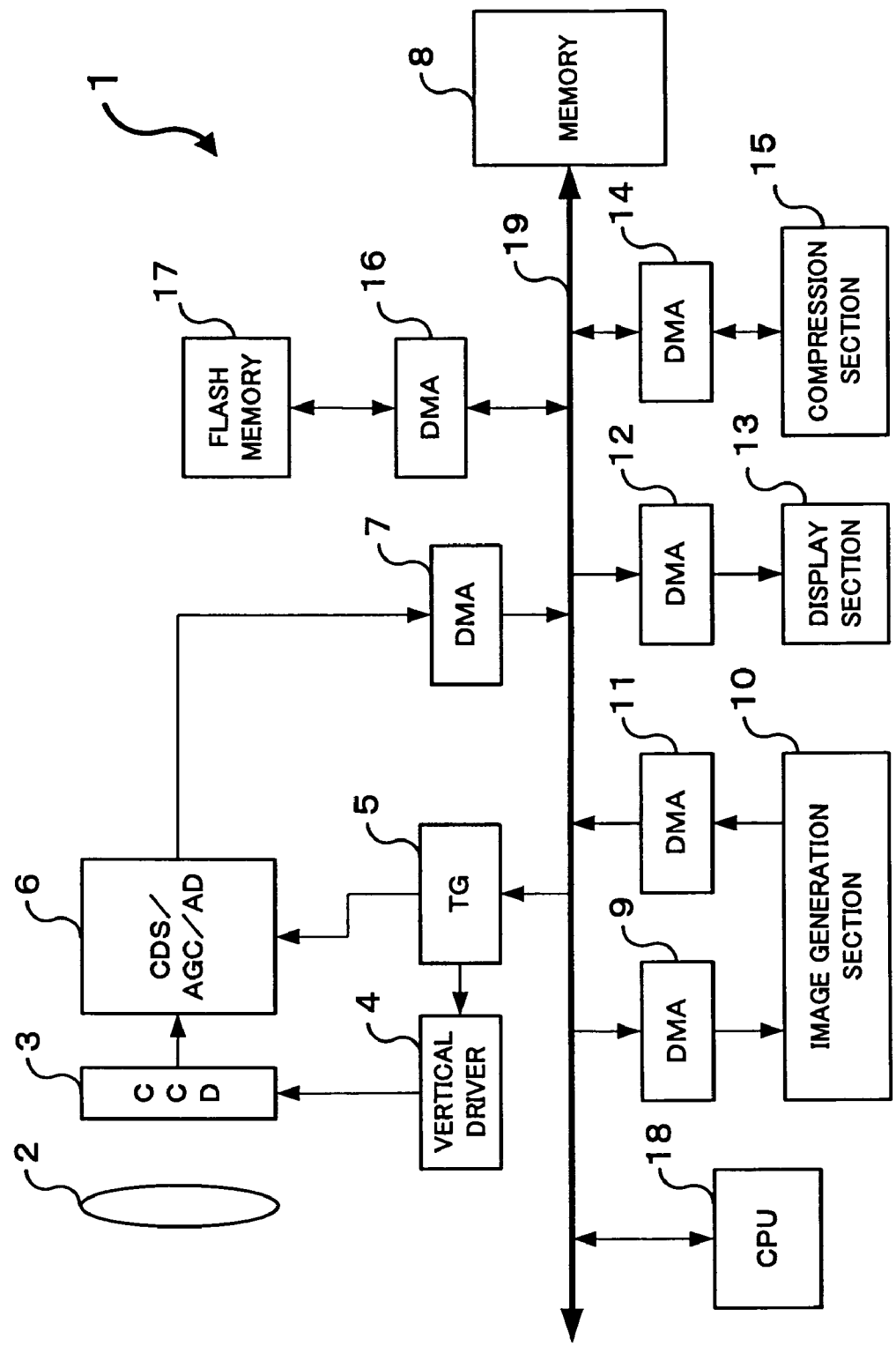
FIG. 1 is a block diagram of a digital camera 1 in an embodiment of the present invention.

FIG. 1 is a block diagram showing the general electrical outline configuration of a digital camera 1 which actualizes a motion vector detection apparatus of the present invention.

The digital camera 1 includes an image pickup lens 2, a CCD 3, a vertical driver 4, a timing generator (TG) 5, a unit circuit 6, a DMA controller (hereinafter referred to as a DMA) 7, a memory 8, a DMA 9, an image generation section 10, a DMA 11, a DMA 12, a display section 13, a DMA 14, a compression section 15, a DMA 16, a flash memory 17, a CPU 18, and a bus 19.

The image pickup lens 2 projects light of an object to the CCD 3. The CCD 3 is scanned and driven by the vertical driver 4 so as to photo-electrically convert intensity of light of an object projected at every certain time interval and outputs it as an imaging signal (image data) to the unit circuit 6. In this case, since the CCD 3 has color filters of Bayer layout, the projected light of an object is photo-electrically converted to an amount of light of each color represented in the RGB value. The operation timings of the vertical driver 4 and the unit circuit 6 are controlled by the CPU 18 via the TG 5.

The TG 5, which is connected to the unit circuit 6, is configured with a Correlated Double Sampling (CDS) circuit for performing correlated double sampling of imaging signals outputted from the CCD 3 and holding them, an automatic gain control (AGC) circuit for performing automatic gain control of the sampled imaging signals, and an analog to digital (A/D) converter for converting the automatic-gain-controlled analog imaging signals to digital signals. The imaging signals of the CCD 3 go though the unit circuit 6 and are stored in the Bayer data (raw data) state in the memory 8 through control of the DMA 7.

The DMA 9 cuts out and reads out the Bayer data stored in the memory 8 on the basis of a cut-out area determined by the CPU 18, and outputs them to the image generation section 10.

The image generation section 10 performs pixel interpolation processing, gamma (γ) correction, white balance processing or the like, and processing of generating luminosity color difference signals (YUV data) to the image data of Bayer data sent from the DMA 9.

DMA 11 stores in the memory 8 the image data of the luminosity color difference signals generated in the image generation section 10. At this time, the image data of the luminosity color difference signals are stored in a region other than a region in which the above-described Bayer data are stored.

The DMA 12 reads out the image data of the YUV data stored in the memory 8, and outputs them to the display section 13.

The display section 13, including a color LCD and a drive circuit thereof, displays the image data outputted from the DMA 12.

The DMA 14 outputs the image data of the YUV data stored in the memory 8 while a movie is shot and recorded and the image data that has been compressed (the compressed image data) to the compression section 15, and stores the image data compressed by the compression section 15 and the image data that has been expanded to the memory 8.

The compression section 15 is a section for executing compression and expansion (for example, compression and expansion in the MPEG format) of the image data.

The DMA 16 reads out the compressed image data stored in the memory 8 to record them in the flash memory 17, and stores the compressed image data recorded in the flash memory 17 to the memory 8.

The CPU 18 is configured with a one-chip micro computer with a function of controlling individual sections of the digital camera 1. Particularly, it has a function of calculating a motion vector of frame data, which characterizes the present invention.

The memory 8 further records a program and data necessary for controlling the CPU 18, and has a storage region necessary for calculating the motion vector.

B. Function of the CPU 18

Next, the function of the CPU 18 which characterizes the present invention will be described.

The CPU 18 calculates a motion vector MV from each of the frame data (image data) outputted from the CCD 3 at every certain time interval by driving the CCD 3.

Figure 2:
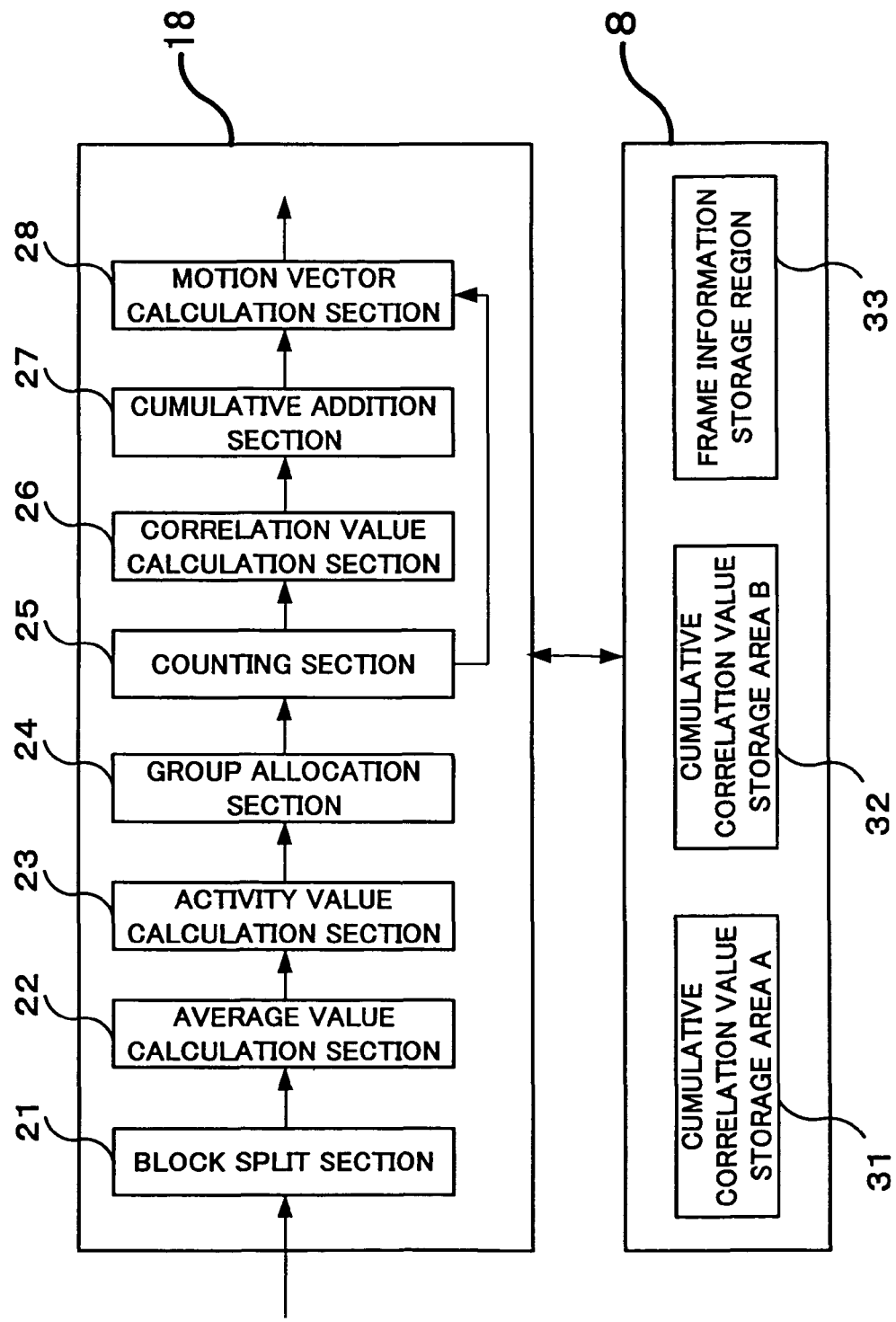
FIG. 2 is a functional block diagram of a CPU 18.

First of all, FIG. 2 shows a functional block diagram of the CPU 18 which characterizes the present invention and the details of the storage region of the memory 8.

The CPU 18 has functions such as a block split section 21, an average value calculation section 22, an activity calculation section 23, a group allocation section 24, a counting section 25, a correlation value calculation section 26, a cumulative addition section 27 and a motion vector calculation section 28 and the like.

The memory 8 has a cumulative correlation value storage area A 31, a cumulative correlation value storage area B 32 and a frame information storage region 33.

When an image is picked up by the CCD 3 and new Bayer data is stored in the memory 8, the CPU 18 acquires new frame data by reading out the new Bayer data from the memory 8. At this stage of acquiring the new frame data, the CPU 18 erases information stored in the cumulative correlation value storage area A 31 and the cumulative correlation value storage area B 32 of the memory 8, and sets the number of counts of the counting section 25 to 0.

Figure 3:
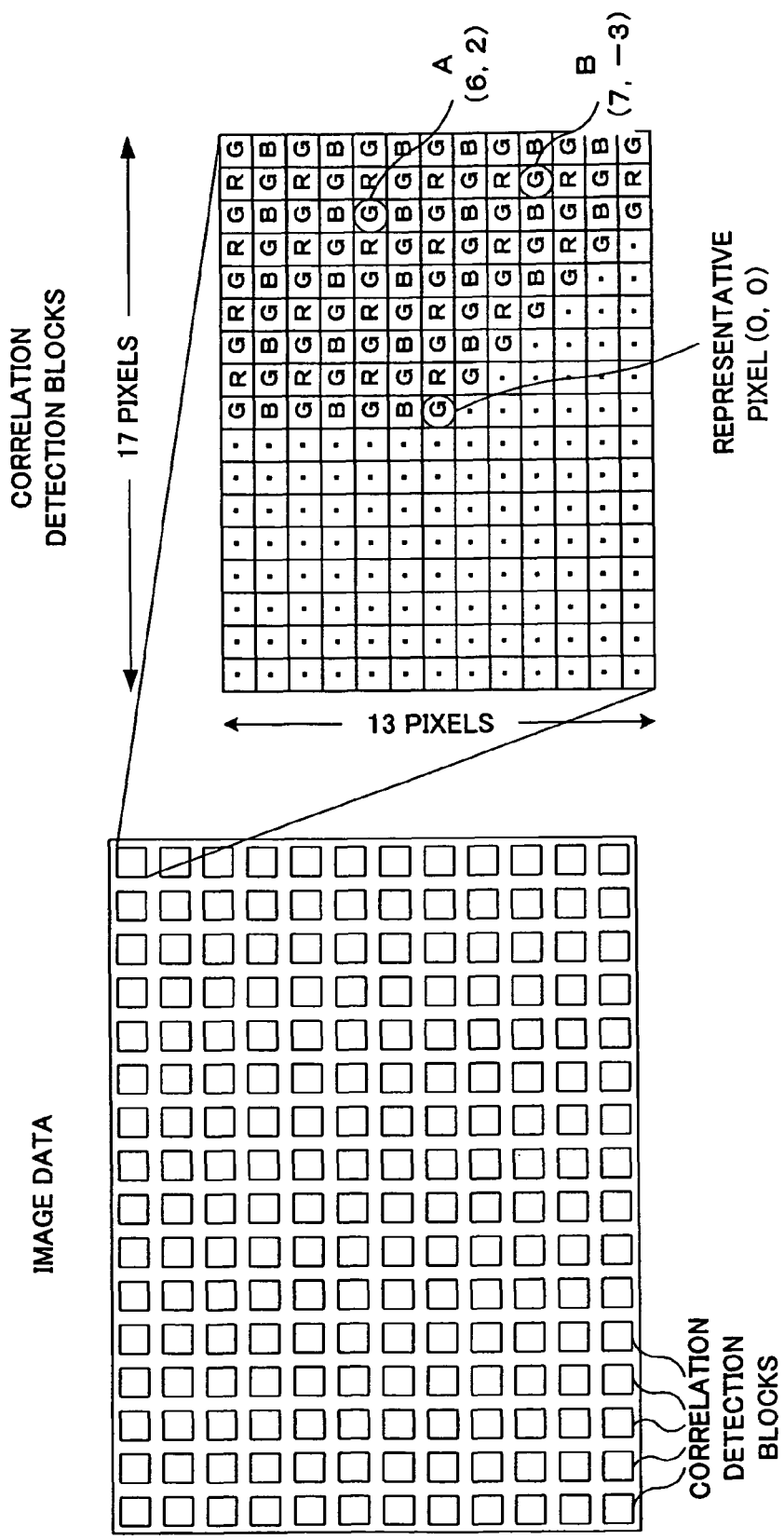
FIG. 3 shows details of each split correlation detection block.

When the block split section 21 acquires single frame data (current frame data) sent from the memory 8, it splits the acquired frame data (Bayer data) into a plurality of correlation detection blocks. Since a single correlation detection block has 17×13 pixels, it splits all pixel values outputted from the CCD 3 into 17×13 pixels. FIG. 3 shows the details thereof. Since the address (x, y) of the center pixel of the split correlation detection block is assumed to be (0, 0), the address (x, y) of the pixel A will be (6, 2), and the address (x, y) of the pixel B will be (7, −3).

The average value calculation section 22 calculates an average pixel value of each of the plurality of correlation detection blocks into which the data has been split by the block split section 21. In this case, it calculates the average pixel value only on the basis of G pixel values in the correlation detection block. That is, it calculates the average value of the G pixel values. In addition, the average value calculation section 22 outputs the calculated average pixel values to the activity calculation section 23, and stores the calculated average pixel value of each of the correlation detection blocks. At this time, it also stores a representative pixel value of each of the correlation detection blocks in the frame information storage region 33. In this case, the pixel value of the center pixel of the correlation detection block is assumed to be the representative pixel value.

Note that, the average value calculation section 22 may calculate the average pixel value only on the basis of the R pixel values or the B pixel values in the correlation detection block, may calculate the average pixel value on the basis of all pixel values (RGB pixel values), may calculate the average pixel value on the basis of pixels at predetermined intervals, or may calculate the final average pixel value through combined use of various average pixel values. The point is, any value may be used so long as it reflects the degree of change of the position in the temporal axis. In addition, only the average pixel value of each of the correlation detection blocks may be stored in the frame information storage region 33, without the representative pixel value of each of the correlation detection blocks being stored. In this case, the average pixel value plays a role of the representative pixel value of the correlation detection block. Alternatively, a pixel addition value determined by adding predetermined pixel values in the correlation detection block may be used in place of the pixel average value.

The activity calculation section 23 calculates a block activity value of each of the correlation detection blocks on the basis of the average pixel value of each of the correlation detection blocks calculated by the average value calculation section 22. This calculation is made by performing subtraction between the average pixel value of each of the correlation detection blocks in the last frame before the current frame (the previous frame) and the average pixel value of each of the correlation detection blocks of the current frame, with the both correlation detection blocks being at the same position, and determining the absolute value (or squaring) of the difference. Accordingly, the absolute value of the difference will be the block activity value. In addition, since the average pixel value of each of the correlation detection blocks of the previous frame has been stored in the frame information storage region 33, the activity calculation section 23 is capable of calculating the block activity value of each of the correlation detection blocks by reading out the average pixel value of each of the correlation detection blocks of the previous frame from the frame information storage region 33.

When the block activity value of each of the correlation detection blocks is calculated, the group allocation section 24 determines whether or not the calculated block activity value is lower than the threshold. It allocates the correlation detection blocks whose block activity value is lower than the threshold to Group A, and the correlation detection blocks whose block activity value is not lower than the threshold to Group B.

The counting section 25 counts the number of correlation detection blocks which are allocated to Group A, and the number of correlation detection blocks which are allocated to Group B, respectively.

The correlation value calculation section 26, the cumulative addition section 27, and the motion vector calculation section 28 calculate, mainly using the representative point matching method, the motion vector of Group A and the motion vector of Group B on the basis of the correlation detection blocks which are allocated to Group A and the correlation detection blocks which are allocated to Group B, respectively. Further, the motion vector calculation section 28 calculates the motion vector of the entire frame on the basis of the calculated motion vector of Group A and the motion vector of Group B.

Specifically, the correlation value calculation section 26 calculates the correlation values H of the pixels from the G pixel values in each of the correlation detection blocks allocated to Group A and Groups B, respectively. The calculation of the correlation values H of the pixels is made by performing subtraction between each of the G pixel values in each of the correlation detection blocks of the current frame and the representative pixel value in each of the correlation detection blocks of the previous frame, with the both correlation detection block being at the same position, and squaring the difference. Accordingly, the square of the difference will be the correlation value H of the pixels. In addition, since the representative pixel value of each of the correlation detection blocks of the previous frame has been stored in the frame information storage region 33, the correlation value calculation section 26 is capable of calculating the correlation values H of the pixels in each of the correlation detection blocks by reading out the representative pixel value in each of the correlation detection blocks of the previous frame from the frame information storage region 33. Note that, in place of the square of the difference, the absolute value of the difference may be determined.

The cumulative addition section 27 adds the correlation values H of the pixels in each of the correlation detection blocks which are allocated to Group A, with the pixels being at the same position, and stores the cumulative correlation value S determined by addition in the cumulative correlation value storage area A 31. In addition, it adds the correlation values H of the pixels in each of the correlation detection blocks which is allocated to Group B, with the pixels being at the same position, and stores the cumulative correlation value S determined by addition in the cumulative correlation value storage area B 32.

The motion vector calculation section 28 detects a motion vector MVa of Group A on the basis of the cumulative correlation value S which is the smallest of the cumulative correlation values S which have been stored in the cumulative correlation value storage area A 31. Similarly, it also detects a motion vector MVb of Group B on the basis of the cumulative correlation value S which is the smallest of the cumulative correlation values S which have been stored in the cumulative correlation value storage area B 32.

Next, the motion vector calculation section 28 detects the motion vector of the current frame on the basis of the detected motion vector of Group A and Group B (MVa, MVb). The detection of the motion vector of the current frame is made from the motion vector of Group A and Group B (MVa, MVb) in accordance with the ratio between the number of calculation detection blocks which are allocated to Group A and the number of correlation detection blocks which are allocated to Group B.

C. Outline of the Present Invention

The outline of the present invention will be described before describing the operation of the digital camera 1 according to the present embodiment.

The present invention calculates a motion vector of a portion in which the image has not significantly changed, such as a portion in which only a hand shake exists (for example, the background), and a motion vector of a portion, in which the image has significantly changed, such as a portion in which the object significantly moves, respectively. Next, the present invention calculates the motion vector of the frame in accordance with the areas which are covered by the portion in which the image has not significantly changed, and the portion in which the image has significantly changed in the frame, respectively.

FIG. 4A and FIG. 4B are diagrams showing the details of the correlation detection blocks which are allocated by the group allocation section 24. It is apparent that although the image of the previous frame and the image of the current frame include a mountain, a house and a person, the position of the person differs between the previous frame and the current frame. That is, it is apparent that the movement of the object (the person) is much larger than that of the hand shake.

Accordingly, the correlation detection blocks are allocated to Groups A and B using the block activity value and a threshold of the correlation detection block, whereby the correlation detection blocks are allocated to portions in which only a hand shake exists and portions in which the object moves. That is, in the case of the correlation detection block in which the object moves, the correlation with the correlation detection block of the previous frame (correlation between the frames) decreases, that is, the block activity value increases (i.e., the difference in the pixel average values increases). The magnitude of the block activity value is judged using the threshold.

Referring to FIG. 4B, the correlation detection blocks filled in white of the current frame represent the correlation detection blocks which are allocated to Group A, and the correlation detection blocks filled in black represent the correlation detection blocks which are allocated to Group B. That is, the correlation detection blocks filled in white represent the correlation detection blocks whose block activity value is smaller than the threshold, and the correlation detection blocks filled in black represent the correlation detection blocks whose block activity value is not smaller than the threshold.

Next, the motion vectors for Group A and Group B are calculated, respectively, and the entire motion vector is calculated in accordance with the ratio between the number of correlation detection blocks of Group A and the number of correlation detection blocks of Group B. This enables calculating the motion vector of the entire image in accordance with the ratio between the area of the hand shake and the area of the object with movement in the image.

For example, as shown in FIG. 4B, in the case where the portion with the hand shake (the background) occupies a larger area than the portion with the object with movement (the person) in the image, the motion vector focusing on the motion vector of the background is selected, as the motion vector of the frame is calculated, from the calculated motion vector of the background (the motion vector of Group A) and the motion vector of the object (the motion vector of Group B).

On the contrary, in the case where the portion with the object with movement (the person) occupies a larger area than the portion with the hand shake (background) in the image, the motion vector focusing on the motion vector of the object is selected, as the motion vector of the frame is calculated, from the calculated motion vector of the background (the motion vector of Group A) and the motion vector of the object (the motion vector of Group B).

That is, the motion vector of the frame is calculated, focusing on the motion vector which occupies a larger area in the image of the frame.

D. Operation

Next, a hand shake compensation processing operation of the digital camera 1 according to the present embodiment will be described referring to a flowchart of FIG. 5.

First, when, a new image is picked up by the CCD 3 and new Bayer data is stored in the memory 8, for example, during the operation of movie shooting and recording, the CPU 18 acquires the new frame data (the $i^{th}$ frame data) by reading out new Bayer data from the memory 8 (Step S1). The frame data may be sequentially acquired for each of the correlation detection blocks, while setting the timing at which the processing of reading out the new Bayer data from the memory 8 to the timing at which storage for one correlation detection block to the memory 8 is complete. In this case, however, for simplifying the description, the frame data for a single image is to be acquired, while setting the timing at which the processing of reading out the new Bayer data from the memory 8 to the timing at which storage for one image to the memory 8 is complete.

Next, the CPU 18 executes the motion vector calculation processing of the new frame data acquired in Step S1 (Step S2). The details will be described later.

When the motion vector calculation processing in Step S2 is complete, the CPU 18 determines a cut-out area for the $i^{th}$ frame on the basis of the motion vector for the $i^{th}$ frame calculated in Step S2 and the cut-out area used for trimming the $(i-1)^{th}$ frame (Step S3).

Subsequently, the CPU 18 controls the DMA 9 so as to cut out and read out the image data (Bayer data) for the $i^{th}$ frame stored in the memory 8 according to the cut-out area for the $i^{th}$ frame determined in Step S3. Further, the CPU 18 has the image generation section 10 output the trimmed image data (Step S4).

Subsequently, the CPU 18 controls the DMA 12 so as to read out the YUV data generated by the image generation section 10 and stored in the memory 8 (Step S5).

Further, the CPU 18 controls the DMAs 14, 16, and the compression section 15 so as to compress the YUV data stored in the memory 8 and record them in the flash memory 17 (Step S6).

The processing of Steps S1 to S6 as described above is repeatedly executed each time a new image is picked up by the CCD 3 and new Bayer data is stored in the memory 8.

Next, the details of the motion vector calculation processing operation of the digital camera 1 according to the present embodiment (Step S2 in FIG. 5) will be described referring to the flowchart of FIG. 6.

Figure 5:
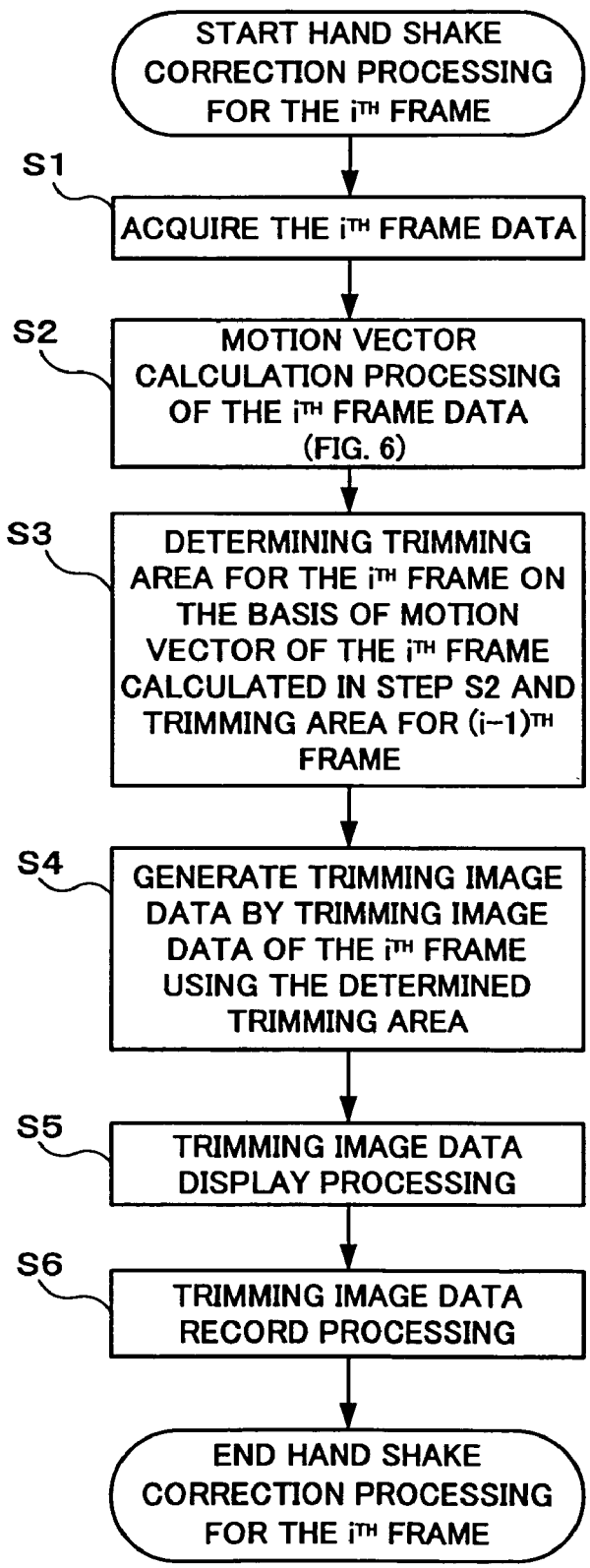
FIG. 5 is a flowchart showing a hand shake correction processing operation of a digital camera according to the embodiment.
Figure 6:
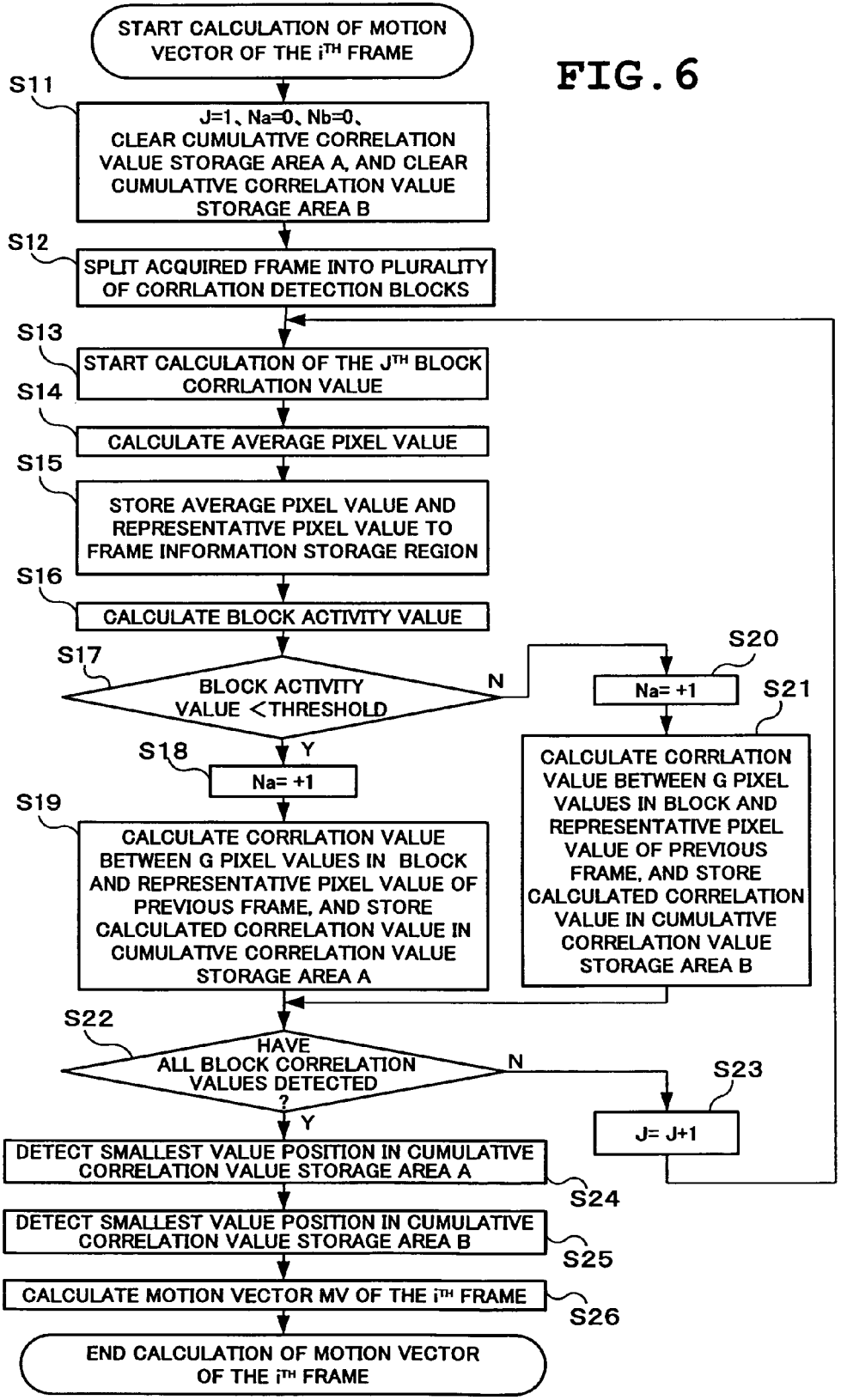
FIG. 6 is a flowchart showing a motion vector calculation processing operation of the digital camera according to the embodiment.

First, when new frame data is acquired in Step S1 of FIG. 5, the CPU 18 sets J to 1 (J: the number of correlation detection blocks), Na to 0, and Nb to 0, and clears (erases) the information stored in the cumulative correlation value storage area A 31 and the cumulative correlation value storage area B 32 (Step S11).

Here, Na represents a count value of the correlation detection block (the correlation detection block allocated to Group A) whose block activity value is judged to be lower than the threshold, and Nb represents a count value of the correlation detection block (the correlation detection block allocated to Group B) whose block activity value is judged to be higher than the threshold.

Further, the block split section 21 splits the acquired frame (the $i^{th}$ frame in this case) into a plurality of correlation detection blocks (Step S12). That is, since a single correlation detection block has 17×13 pixels, the block split section 21 splits all pixel values outputted from the CCD 3 into blocks each having 17×13 pixels.

Next, the CPU 18 starts calculation of the correlation value H of the $J^{th}$ (in this case, the first, since J=1) correlation detection block (Step S13).

Next, the average value calculation section 22 calculates the average value of the pixel values in the $J^{th}$ correlation detection block (the average pixel value) (Step S14). Here, the average value of the G pixel values in the $J^{th}$ correlation detection block is calculated.

Next, the average value calculation section 22 stores the calculated average pixel value of the $J^{th}$ correlation detection block in the frame information storage region 33 of the memory 8, and also stores the representative pixel value of the $J^{th}$ correlation detection block in the frame information storage region 33 (Step S15). The representative pixel value refers to a pixel value of the center pixel of the $J^{th}$ correlation detection block, that is, the pixel value of the pixel the address (x, y) of which will be (0, 0). Note that, the average pixel value of the correlation detection block may be used as the representative pixel value.

The stored representative pixel value of the $J^{th}$ correlation detection block and the block average value of the $J^{th}$ correlation detection block are used when calculating the motion vector of the following frame (the $(i+1)^{th}$ frame), that is, in Step S6 and Step S9.

Next, the activity calculation section 23 calculates the $J^{th}$ correlation detection block activity value (Step S16). The calculation is made as follows: reading out the average value of the G pixel values in the $J^{th}$ correlation detection block of the previous frame (the $(i-1)^{th}$ frame) is stored in the frame information storage region, and determines the absolute value of the difference between the average value of the $J^{th}$ correlation detection block of the $(i-1)^{th}$ frame that has been read out and the average value of the $J^{th}$ correlation detection block of the $i^{th}$ frame calculated in Step S4. The absolute value of the difference is set as the block activity value.

Next, the group allocation section 24 judges whether or not the calculated block activity value is lower than the threshold (Step S17). That is, it judges whether to allocate the blocks to Group A or Group B in accordance with the calculated block activity value and the threshold.

In Step S17, when the calculated block activity value is judged to be lower than the threshold, the group allocation section 24 allocates the correlation detection blocks to Group A, and the counting section 25 sets the count of Na to +1 (Step S18).

Next, the correlation value calculation section 26 respectively calculates the correlation values H of the pixels (the square of the difference) from each of the G pixel values in the $J^{th}$ correlation detection block and the representative pixel value of the $J^{th}$ correlation detection block of the previous frame. The cumulative addition section 27 adds the calculated correlation value H of each of the pixels to each of the cumulative correlation value S stored in the cumulative correlation value storage area A 31 (Step S19) and stores the value, and the routine advances to Step S22. Note that, in the case where the cumulative correlation value S has not been stored in the cumulative correlation value storage area A 31, each of the calculated correlation values H of the pixels is stored as it is, and the thus stored correlation value H becomes the cumulative correlation value S.

The calculation of the correlation value H will be described specifically as follows: the correlation value H of the pixels is determined by subtracting the representative pixel value of the $J^{th}$ correlation detection block of the $(i-1)^{th}$ frame stored in the frame information storage region 33 from each of the G pixel values of the $J^{th}$ correlation detection block of the $(i-1)^{th}$ frame, and by squaring each of the values determined by the subtraction. For example, when it is assumed that there are five G pixels in the $J^{th}$ correlation detection block, the number of the correlation values H of the pixels to be determined will be 5. This is because the representative pixel value of the $J^{th}$ correlation detection block of the previous frame is subtracted from the five G pixel values in the $J^{th}$ correlation detection block of the acquired frame in Step S1 of FIG. 5, and each of the values determined by the subtraction is squared.

Figure 7A:
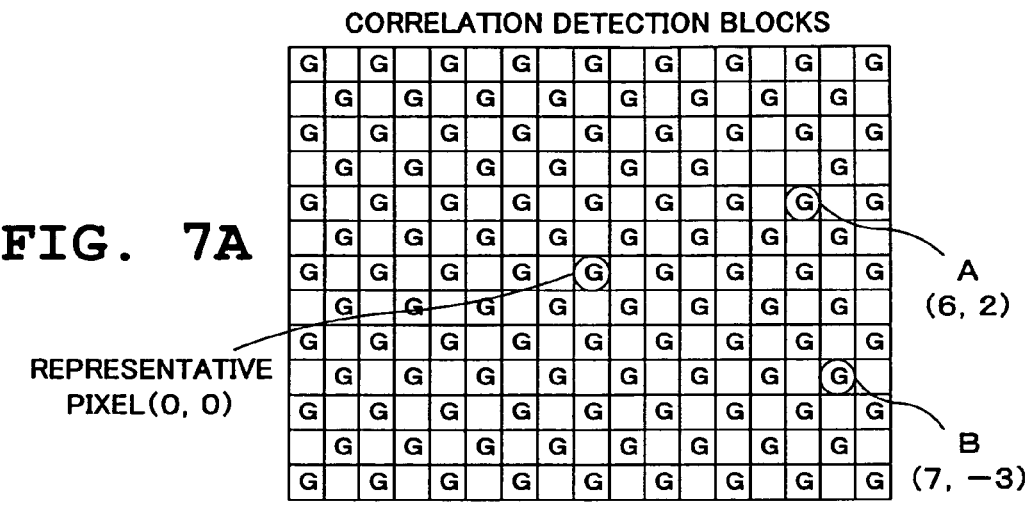
FIG. 7A, FIG. 7B and FIG. 7C are diagrams for illustrating a method of addition to a correlation value H and a cumulative correlation value S.
Figure 7B:
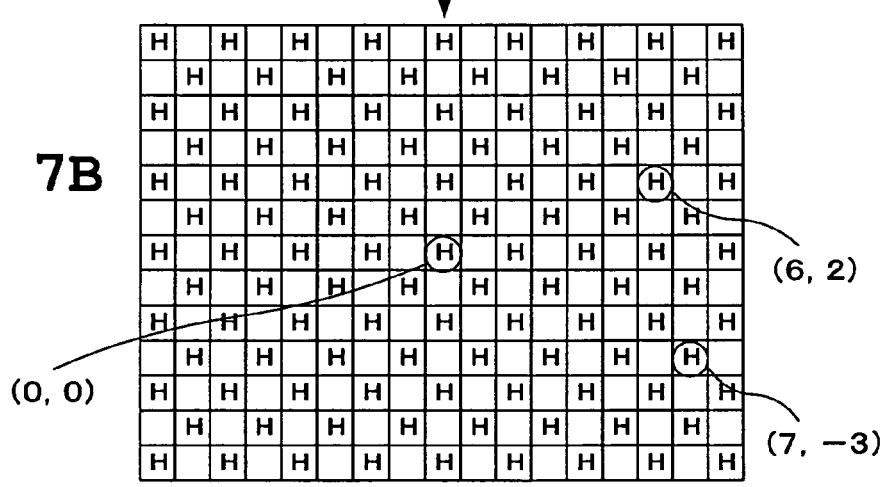

FIG. 7A indicates each of the G pixel values of the $J^{th}$ detection block, and FIG. 7B shows the details of the correlation value H of each of the pixels calculated from the $J^{th}$ detection block. At this time, the address of the pixel on which the calculation is made is used as the address of the calculated correlation value H of each of the pixels. That is, the address (x, y) of the correlation value H of the pixel calculated on the basis of the pixel A will be (6, 2), and the address (x, y) of the correlation value H of the pixel calculated on the basis of the pixel B will be (7, −3).

Next, a specific description will be given on the addition of each of the calculated correlation values H on each of the cumulative correlation values S which have been stored in the cumulative correlation value storage area A 31.

First of all, the cumulative correlation value S which has been stored in the cumulative correlation value storage area A 31 refers to a value determined by adding the calculated correlation values H of each of the pixels of each of the correlation detection blocks, while the pixels are at the same position.

Figure 8:
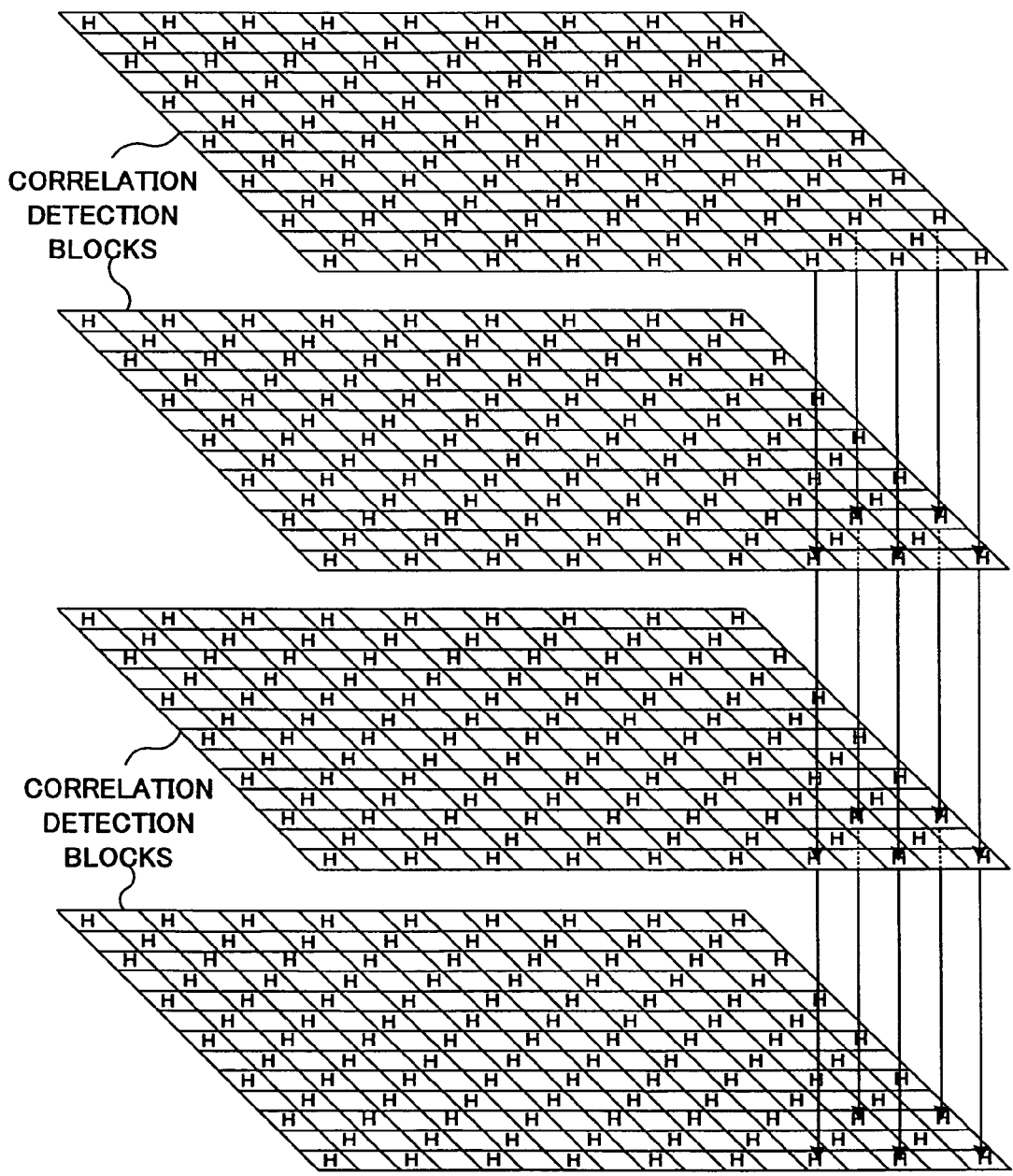
FIG. 8 is a diagram for illustrating a cumulative correlation value S.

That is, the cumulative correlation value S is a value determined by selecting the correlation values H of the pixels whose address are the same out of the correlation values H of each of the pixels calculated in each of the correlation detection blocks as shown in FIG. 8. The same number of the cumulative correlation values S exists as those of the correlation values H and the number of the G pixels in the correlation detection block.

At this time, the address of the correlation value H of the pixel which is determined by the addition is used for each cumulative correlation value S.

For example, the address (x, y) of the cumulative correlation value S determined by adding the correlation values H of the pixels with the address (x, y) being (6, 2) will be (6, 2), and the address (x, y) of the cumulative correlation value S determined by adding the correlation values H of the pixels with the address (x, y) being (7, −3) will be (7, −3).

Figure 7C:
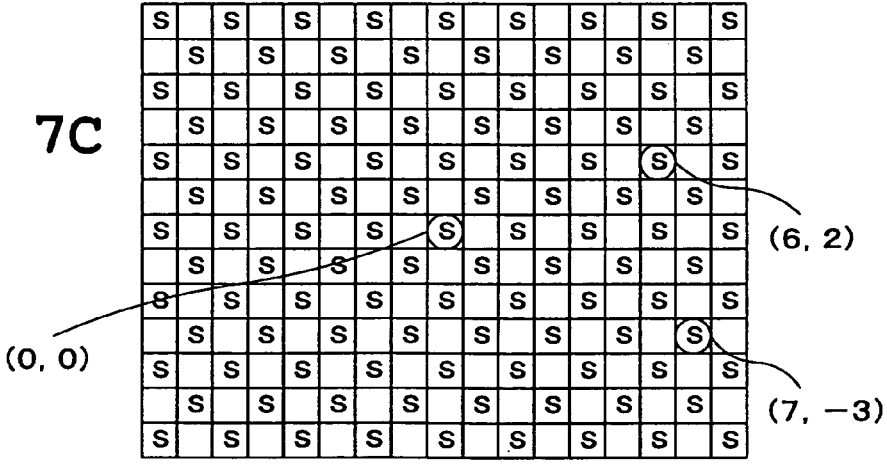

FIG. 7C shows the details of the cumulative correlation value S, and the newly calculated correlation value H of the pixels is added to the cumulative correlation value S. At this time, the correlation value H of the pixels with the same address as that of the cumulative correlation value S is added to the cumulative correlation value S as shown in FIG. 7B.

On the other hand, when it is judged that the calculated block activity value is not smaller than the threshold in Step S17, the group allocation section 24 allocates the correlation detection blocks to Group B, and the counting section 25 sets the count of Nb to +1 (Step S20).

Next, as is the case with Step S19, the correlation value calculation section 26 calculates the correlation values H of the pixels (the square of the difference) from each of the G pixel values in the $J^{th}$ correlation detection block and the representative pixel value of the $J^{th}$ correlation detection block of the previous frame, respectively. The cumulative addition section 27 adds each of the calculated correlation values H of the pixels to each of the cumulative correlation values S stored in the cumulative correlation value storage area B 32 and stores it (Step S21), and the routine advances to Step S22. Note that, in the case where the cumulative correlation value S has not been stored in the cumulative correlation value storage area B 32, the calculated correlation value H of each of the pixels is stored as it is, and thus the stored correlation value H of the pixel will be the cumulative correlation value S.

When the routine advances to Step S22, the CPU 18 judges whether or not the correlation value H has been calculated from all correlation detection blocks for the $i^{th}$ frame (Step S22).

In Step S22, when it is judged that there is a correlation detection block of which the correlation value H of the pixel has not been calculated, J is set to J=J+1, and the routine returns to Step S13. This enables determining the correlation value H of the pixels of the correlation detection block of the next number.

On the other hand, in Step S22, when it is judged that there is no correlation detection block of which the correlation value H has not been calculated, the motion vector calculation section 28 detects the position, that is, the address of the cumulative correlation value S which is the smallest of the cumulative correlation values S which have been stored in the cumulative correlation value storage area A 31 (Step S24). The detected address will be the motion vector MVa.

Next, the motion vector calculation section 28 detects the position, that is, the address of the cumulative correlation value S which is the smallest of the cumulative correlation values S which have been stored in the cumulative correlation value storage area B 32 (Step S25). The detected address will be the motion vector MVb.

Next, the CPU 18 detects the motion vector MV of the $i^{th}$ frame (Step S26). The detection of the motion vector of the $i^{th}$ frame is made in such a manner that the motion vector MV of the current frame is detected from the motion vector of Group A and Group B (MVa, MVb) in accordance with the ratio between the numbers of correlation detection blocks which are allocated to Group A and the number of correlation detection blocks which are allocated to Group B. Specifically, the detection is made according to the following equation.

$$MV=(Na\times MVa+Nb\times MVb)/(Na+Nb) \quad \text{(Equation 1)}$$

Na: the number of correlation detection blocks which are allocated to Group A

Nb: the number of correlation detection blocks which are allocated to Group B

Note that, when the CPU 18 detects the motion vector MV of the $i^{th}$ frame in Step S26, the routine moves to the processing of Step S3 of FIG. 5, and the CPU 18 executes the processing thereafter.

D. Effects

As described above, in the present embodiment, the block activity value of each of the split correlation detection blocks is calculated, each of the correlation detection blocks is allocated to either of two groups on the basis of the calculated block activity value and the threshold, the motion vector of each group is calculated for each allocated group using the representative point matching method, and the motion vector MV of the current frame is detected from the motion vector of Group A and Group B in accordance with the number of blocks for each group. Therefore, it is possible to calculate an appropriate motion vector with simplified processing in accordance with the ratio between the area of the portion in which the image has not significantly changed (for example, the hand shake portion) and the portion in which the image has changed significantly (for example, the portion with the object with movement) of the image. For example, in the case where the hand shake portion (for example, the background portion) occupies the most area of the image, the motion vector focusing on the motion vector of the hand shake portion is calculated. In the case where the portion with the object with movement occupies the image, the motion vector focusing on the motion vector of the portion of the object with movement is calculated.

In addition, since the motion vector for each group is calculated by the representative point matching method using the Bayer data (CCD data, raw data), the interpolation processing is eliminated and the processing time is reduced. In addition, only the G pixel values are used to calculate the motion vector for each group with the representative point matching method. Accordingly, the number of pixels is halved and thus the number of computations is also halved, thereby further reducing the processing time.

E. Modifications

Although all G pixel values are used for calculating the average pixel values and the correlation values H of the pixels in the above-described embodiment, thinned G pixel values may be used.

In addition, although the motion vector MV is detected for each frame in the above-described embodiment, the motion vector MV may be detected for each field.

In addition, although the average pixel value is calculated from each of the correlation detection blocks of the frame data in the above-described embodiment, the resultant data using the photometry circuit for AE may be used. That is, any value may be used so long as it reflects the change in the temporal axis at the position. In this case, the AE detection block must correspond to the correlation detection block.

In addition, although the group allocation section 24 allocates each of the correlation detection blocks to two groups in the above-described embodiment, it may allocate them to three groups or four groups. In this case, a plurality of thresholds are provided in accordance with the number of groups to which the blocks are to be allocated, the cumulative correlation value storage area corresponding to the number of groups is provided, the motion vector is provided for each group, and a single motion vector MV is calculated from the motion vector for each group in accordance with the ratio between the numbers of calculation detection blocks for each group.

In addition, although the block activity value is calculated merely as the average value of the G pixel values in the above-described embodiment, the average value may be calculated by performing weighting, and the value may be the block activity value. For example, when it is assumed that there are three pixel values, G1, G2 and G3, although the normal average value shall be (G1+G2+G3)/3, it will become (G1+G2×2+G3)/3 in the case where the average value is calculated with weighing.

In addition, although the motion vector is detected using the entire image in the above-described embodiment, the motion vector may be detected using the image in some area (for example, the focus area).

In addition, although the motion vector of the frame is detected on the basis of the Bayer data in the above-described embodiment, the motion vector of the frame may be detected on the basis of the image data of luminosity color difference signal generated by the image generation section 10.

Further, although the motion vector of the frame is detected on the basis of the Bayer data in the above-described embodiment, the motion vector of the frame may be detected on the basis of raw data other than the Bayer data. The point is, any raw data which comply with the color filter array provided on the image pickup elements, are acceptable.

In addition, although the description has been given on the case where the camera shake compensation processing is executed on movie data which is shot and recorded during the movie shooting and recording in the above-described embodiment, the camera shake compensation processing may be executed on the movie data which is displayed on the display section 13 while a through image which does not involve recording operation of the image data (finder image) may be executed. Alternatively, the camera shake compensation processing may be executed to the movie data replayed and displayed in the display section 13 by reading out the movie which is picked up by the CCD 3 and recorded in the flash memory 17.

In addition, although the hand shake compensation processing (FIG. 5) and the motion calculation processing of the frame (FIG. 6) is executed by the CPU 18 through software in the above-described embodiment, it may be actualized through hardware.

Further, although the description has been made in the case where the motion vector detection apparatus according to the present invention is applied to a digital camera in the above-described embodiment, the present invention is not limited to this. It may be applied to a cell phone with camera, a PDA with camera, a PC with camera, an IC recorder with camera, a digital camera or the like. Further, it may be applied to a cell phone, a PDA, a PC, a television receiver, an image receiver or the like without camera. The point is that any equipment which is capable of detecting the motion vector from the frame data is acceptable.

Furthermore, although the program product of the digital camera which is an embodiment of the present invention is stored in the memory (for example, ROM, etc.) of the digital camera, this imaging program is stored on a computer-readable medium and should also be protected in the case of manufacturing, selling, etc. of only the program. In that case, the method of protecting the program with a patent will be realized by the form of the computer-readable medium on which the imaging program product is stored.

While the present invention has been described with reference to the preferred embodiments, it is intended that the invention be not limited by any of the details of the description therein but includes all the embodiments which fall within the scope of the appended claims.

What is claim is:

1. A motion vector detection apparatus comprising:
   an acquisition section which acquires frame data;
   an activity calculation section which calculates a block activity value based on the frame data acquired by the acquisition section for each of a plurality of correlation detection blocks;
   an allocation section which allocates the plurality of correlation detection blocks between a first group and a second group based on the block activity value of each of the correlation detection blocks calculated by the activity calculation section;
   a motion vector calculation section which calculates a motion vector for the first group and a motion vector for the second group between which the allocation has been performed by the allocation section; and
   a detection section which detects a motion vector of the frame data by calculating a single motion vector based on the motion vector for the first group and the motion vector for the second group calculated by the motion vector calculation section in accordance with a ratio between a number of correlation detection blocks which are allocated to the first group and a number of correlation detection blocks which are allocated to the second group by the allocation section,
   wherein the detection section comprises:
      a motion vector synthesizing section which synthesizes the motion vector for the first group and the motion vector for the second group calculated by the motion vector calculation section; and
      a changing section which changes a synthesis ratio of the motion vector for the first group and the motion vector for the second group used by the motion vector synthesizing section in accordance with the ratio between the number of correlation detection blocks which are allocated to the first group and the number of correlation detection blocks which are allocated to the second group by the allocation section.

2. The motion vector detection apparatus according to claim 1, wherein the activity calculation section calculates the block activity value of a given correlation detection block by determining a difference between: (i) a value based on pixel values in said given correlation detection block of a current frame data, and (ii) a value based on pixel values in said given correlation detection block of a previous frame data at a same position which corresponds to said given correlation detection block of the current frame data.

3. The motion vector detection apparatus according to claim 2, wherein the activity calculation section calculates the block activity value of said given correlation detection block by determining a difference between:
   (i) an average value of the pixel values in said given correlation detection block of the current frame data, and
   (ii) an average value of the pixel values in said given correlation detection block of the previous frame data at the same position.

4. The motion vector detection apparatus according to claim 2, wherein the activity calculation section calculates the block activity value of said given correlation detection block by determining a difference between: (i) a value based on pixel values of some pixels in said given correlation detection block of the current frame data, and (ii) a value based on pixel values of some pixels in said given correlation detection block of the previous frame data at the same position.

5. The motion vector detection apparatus according to claim 2, wherein the activity calculation section calculates the block activity value of said given correlation detection block by determining a difference between: (i) the value based on the pixel values in said given correlation detection block of current raw data, and (ii) the value based on the pixel values in said given correlation detection block of previous raw data.

6. The motion vector detection apparatus according to claim 5, wherein the raw data is defined as Bayer data.

7. The motion vector detection apparatus according to claim 6, wherein the activity calculation section calculates the block activity value of said given correlation detection block by using G pixel values in said given correlation detection block.

8. The motion vector detection apparatus according to claim 1, wherein the allocation section includes a judgment section which judges whether or not the block activity value of each correlation detection block calculated by the activity calculation section is lower than a threshold, and
   wherein the allocation section allocates the correlation detection blocks whose block activity values are judged to be lower than the threshold by the judgment section to the first group, and allocates the correlation detection blocks whose block activity values are judged to be higher than the threshold by the judgment section to the second group.

9. The motion vector detection apparatus according to claim 1, wherein the motion vector calculation section:

includes a correlation calculation section which calculates, for each correlation detection block, correlation values of pixels in the correlation detection block by determining a difference between pixel values in the correlation detection block of a current frame data and a representative pixel value of the correlation detection block of a previous frame data at a same position, and calculates the motion vector for the first group and the motion vector for the second group based on the correlation values of the pixels in each of the correlation detection blocks calculated by the correlation calculation section.

10. The motion vector detection apparatus according to claim 9, wherein the correlation calculation section calculates, for each correlation detection block, the correlation values of the pixels in the correlation detection block by determining a difference between some pixel values in the correlation detection block of the current frame data and the representative pixel value of the correlation detection block of the previous frame data at the same position.

11. The motion vector detection apparatus according to claim 9, wherein the correlation calculation section calculates, for each correlation detection block, the correlation values of the pixels in the correlation detection block by determining a difference between the pixel values in the correlation detection block of a current raw data and the representative pixel value in the correlation detection block of a previous raw data at the same position.

12. The motion vector detection apparatus according to claim 11, wherein the raw data is defined as Bayer data.

13. The motion vector detection apparatus according to claim 12, wherein the correlation calculation section calculates, for each correlation detection block, the correlation values of the pixels in the correlation detection block by determining a difference between G pixel values in the correlation detection block of the current Bayer data and a representative G pixel value in the correlation detection block of the previous Bayer data at the same position.

14. The motion vector detection apparatus according to claim 9, wherein the motion vector calculation section:
comprises a cumulative addition section which adds the correlation values of the pixels of which pixel positions are the same in the correlation detection blocks calculated by the correlation calculation section, and
calculates the motion vector for each group based on the values for each group added by the cumulative addition section.

15. The motion vector detection apparatus according to claim 14, wherein the motion vector calculation section calculates each of the motion vector for the first group and the motion vector for the second group based on a pixel position of a smallest value out of the values that are determined by the addition of the cumulative addition section.

16. An imaging apparatus comprising:
an image pick-up section which picks up an image of an object and outputs image data;
an activity calculation section which calculates block activity values based on the image data outputted from the image pick-up section;
an allocation section which allocates a plurality of correlation detection blocks between a first group and a second group based on the block activity values of the correlation detection blocks calculated by the activity calculation section;
a motion vector calculation section which calculates a motion vector for the first group and a motion vector for the second group between which the allocation has been performed by the allocation section;
a detection section which detects a motion vector of the image data by calculating a single motion vector based on the motion vector for the first group and the motion vector for the second group calculated by the motion vector calculation section in accordance with a ratio between a number of correlation detection blocks which are allocated to the first group and a number of correlation detection blocks which are allocated to the second group by the allocation section; and
a hand shake correction section which executes hand shake correction processing to the image data based on the motion vector of the image data detected by the detection section,
wherein the detection section comprises:
a motion vector synthesizing section which synthesizes the motion vector for the first group and the motion vector for the second group calculated by the motion vector calculation section; and
a changing section which changes a synthesis ratio of the motion vector for the first group and the motion vector for the second group used by the motion vector synthesizing section in accordance with the ratio between the number of correlation detection blocks which are allocated to the first group and the number of correlation detection blocks which are allocated to the second group by the allocation section.

17. The imaging apparatus according to claim 16, further comprising a record section which records the image data corrected by the hand shake correction section.

18. The imaging apparatus according to claim 16, further comprising a display section which displays the image data corrected by the hand shake correction section.

19. The imaging apparatus according to claim 16, further comprising:
a record section which records the image data outputted from the image pick-up section; and
an output section which reads out and outputs the image data recorded in the record section,
wherein the activity calculation section, the allocation section, the motion vector calculation section, the detection section, and the hand shake correction section execute processing to the image data output from the output section.

20. A method of detecting a motion vector comprising:
acquiring frame data;
calculating a block activity value for each of a plurality of correlation detection blocks based on the acquired frame data;
allocating the plurality of correlation detection blocks between a first group and a second group based on the calculated block activity value of each of the correlation detection blocks;
calculating a motion vector for the first group and a motion vector for the second group between which the allocation has been performed; and
detecting a motion vector of the frame data by calculating a single motion vector based on the calculated motion vector for the first group and the motion vector for the second group in accordance with a ratio between a number of correlation detection blocks which are allocated to the first group and a number of correlation detection blocks which are allocated to the second group,
wherein the motion vector of the frame data is detected by synthesizing the calculated motion vector for the first group and the motion vector for the second group using a synthesis ratio which is changed in accordance with the ratio between the number of correlation detection blocks which are allocated to the first group and the number of correlation detection blocks which are allocated to the second group.

21. A non-transitory computer-readable recording medium having stored thereon a program that is executable by a computer for performing motion vector detection processing in an imaging apparatus, the program causing the computer to perform functions comprising:

acquiring frame data;

calculating a block activity value for each of a plurality of correlation detection blocks based on the acquired frame data;

allocating the plurality of correlation detection blocks between a first group and a second group based on the calculated block activity value of each of the correlation detection blocks;

calculating a motion vector for the first group and a motion vector for the second group between which the allocation has been performed; and detecting a motion vector of the frame data by calculating a single motion vector based on the calculated motion vector for the first group and the motion vector for the second group in accordance with a ratio between a number of correlation detection blocks which are allocated to the first group and a number of correlation detection blocks which are allocated to the second group, wherein the motion vector of the frame data is detected by synthesizing the calculated motion vector for the first group and the motion vector for the second group using a synthesis ratio which is changed in accordance with the ratio between the number of correlation detection blocks which are allocated to the first group and the number of correlation detection blocks which are allocated to the second group.

\* \* \* \* \*